May 26, 1925.

A. DEWANDRE

MOTOR BRAKE

Filed Jan. 12, 1924

Inventor:
Albert Dewandre

Patented May 26, 1925.

1,539,166

UNITED STATES PATENT OFFICE.

ALBERT DEWANDRE, OF LIEGE, BELGIUM.

MOTOR BRAKE.

Application filed January 12, 1924. Serial No. 685,814.

REISSUED

*To all whom it may concern:*

Be it known that I, ALBERT DEWANDRE, engineer, a subject of the King of Belgium, and resident of Liege, in the Kingdom of Belgium, have invented certain new and useful Improvements in Motor Brakes; and I do hereby declare the following to be full, clear, and exact description of the invention, such as will enable others skilled in the art to which it appertains to make and use the same, reference being had to the accompanying drawings, and to letters or figures of reference marked therein, which form a part of this specification.

The present invention relates to an improved suction brake for vehicles equipped with internal combustion engines, in which the braking action is produced by the partial vacuum created by the suction of the engine. This partial vacuum acts on a piston working in a cylinder which can be put in communication either with the atmosphere or with the suction pipe of the engine.

The object of the invention is to provide a brake of the character specified comprising a minimum number of parts whose operation is certain; the arrangement being such as to reduce to a minimum the amount of air exhausted by the engine for the braking requirements.

According to the invention, the valves for controlling the communication of the brake cylinder with the partial vacuum or with the atmosphere are regulated by a member whose position depends upon the distance between the two parts of a lost-motion connection located between the brake pedal or other brake-controlling element and the rodding.

This member operates the valves in such a way that the one which controls the communication of the cylinder with the atmosphere is closed before the one which controls communication with the suction pipe opens.

The movements of the aforesaid valve-controlling member can be effected by means of a flexible shaft or cable of the Bowden type which is connected at one end to the member in question and to a fixed part of the apparatus, and at the other end to the two parts of the above-mentioned lost-motion connection.

Figure 1:
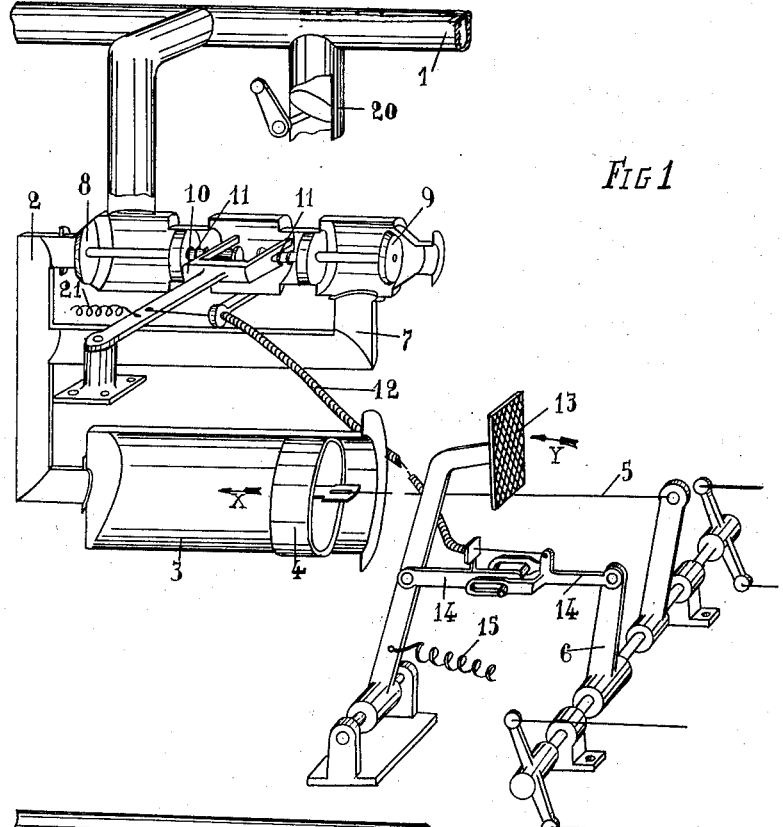
Figure 2:
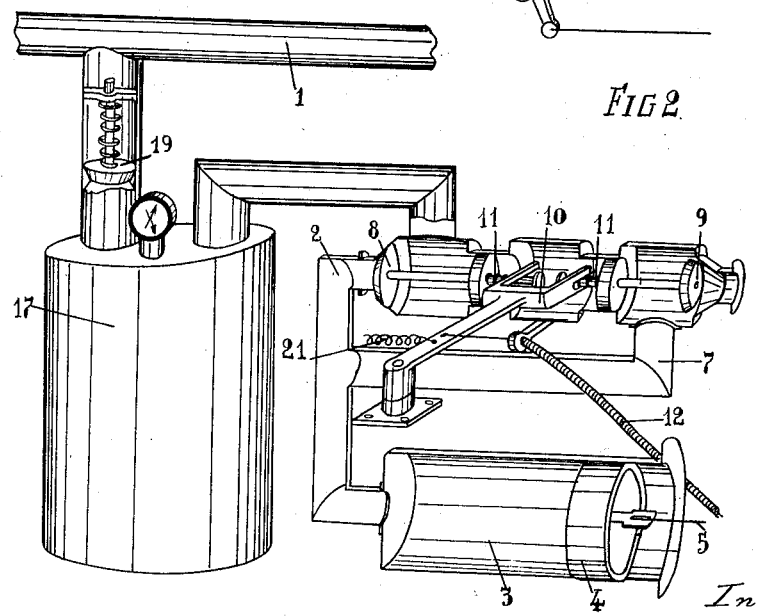

Two constructional forms of this invention are illustrated by way of examples in the accompanying drawings in which:

Figure 1 illustrates diagrammatically one constructional form of the improved motor brake, and Figure 2 illustrates diagrammatically a second constructional form thereof.

Referring first to Figure 1 the suction pipe 1 of the internal combustion engine (not shown) into which the duct 20 opens from the carburetor (not shown), is connected by a pipe 2 to a cylinder 3 in which works a piston 4 the outer face of which is connected by a rod or cable 5 to a lever arm 6 comprised in the brake rodding A pipe 7 opening into the atmosphere branches off the pipe 2.

In the illustrated constructional form a distributor consisting of two valves 8 and 9 arranged respectively in the pipes 2 and 7, allows of placing the cylinder 3 in communication with the atmosphere or with the partial vacuum generated in the engine suction pipe 1 by the working of the engine of the vehicle.

If communication with the atmosphere be cut off by closing the valve 9, and if the valve 8 be then opened, the partial vacuum produced by the suction of the engine in the pipe 1 will be transmitted to the brake cylinder 3.

This partial vacuum will draw the piston 3 towards the end of the cylinder in the direction of the arrow X, carrying along with it the cable or rod 5 that is connected to the brake rodding in such a manner as to thereby produce the braking operation.

If at this moment the valve 8 be returned to its closed position, the piston 3 theoretically will remain in the position it is then occupying, until communication with the atmosphere has been re-established so as to allow the piston 3 to move back into its initial position oppositely to the arrow X by the action of returning springs (not shown) provided at any point of the brake installation.

For the purpose of co-ordinating the movements of the piston in the brake cylinder with the degree of braking force desired by the operator, the distributor consisting of the two valves 8, 9 is controlled from the brake pedal 13 by means of a fork 10 connected to the said pedal by a member 12 here shown as a Bowden shaft. The two prongs of the fork act upon stops provided on the ends of the tail pieces of the valves 8, 9. Springs 11 have a constant tendency to close these valves. The lengths of the tail pieces of these valves are such as to ensure that the valves shall act one after the other.

Considering first the position shown in Figure 1, it will be perceived that the valve 9 must be completely closed before the valve 8 begins to open, and vice versa.

It is also to be noted that the brake pedal 13 is connected to the lever arm 6 by a coupling 14 comprising two elements capable of sliding relatively to each other in such a manner when the pedal 13 is at the end of its stroke indicated by the arrow Y, that is to say, in the position in which the valve 8 is fully open, the said two elements of the coupling 14 will be in positive engagement with each other if the operator continues to press the pedal 13 in the same direction.

In this arrangement, pressure exerted upon the pedal 13 will first increase the distance between the two movably-related parts 14 of the lost-motion connection which is located between the said pedal and the lever arm 6 of the brake rodding. The increase of this distance effects, through the intermediary of the Bowden shaft 12, a decrease in the distance between the fork 10 and a fixed point on the apparatus whereto is attached the end of the flexible sheath member of said shaft. Consequently, the fork 10 is caused to swing in a clockwise direction about its pivot, as a result whereof the valve 9 which controls communication between the brake cylinder 3 and the atmosphere is first of all closed. Thereafter, if the movement of the pedal has been sufficiently great, the valve 8 opens and communication is established between the brake cylinder and the suction pipe 1 of the engine.

A partial vacuum is thus set up in said cylinder 3, and the brake piston 4 moves in the direction of the arrow X, thus exerting upon the rodding a force which tends to apply the brakes. At the same time, the lever arm 6 moves in such a way as to decrease the distance between the two parts 14 of the lost-motion connection. As a result, the fork 10 moves counter-clockwise to a slight extent, thus effecting the closing of valve 8; but under normal operating conditions, this last movement of the fork will not be continued to the point where valve 9 is opened. Further depression of the pedal will have the effect of again increasing the distance between the two movably related parts 14, so that the fork 10 will open valve 8, thus exerting a fresh braking force upon the brakes.

It will be apparent, in consequence, that each position of the pedal corresponds to a braking action of predetermined intensity. Moreover, it is to be noted that if, at any given moment, an entry of air into cylinder 3 takes place, the braking action will be diminished so that the lever arm 6 of the rodding will move in such a way as to increase the distance between the two parts 14. As a result, the valve 8 will open and the engine suction will immediately compensate the air accidentally admitted.

On the other hand, if the operator permits the pedal to return toward its initial position, the distance between the two parts 14 decreases and the fork 10 moves counter-clockwise, so that the valve 8 first closes and then valve 9 opens in turn and establishes communication between the brake cylinder and the atmosphere, the result of which is to diminish the braking action. The lever arm 6 moves at the same time so that the distance between the parts 14 tends to increase. As soon as this distance has reached a predetermined extent, which will happen more or less rapidly according as the pedal has been moved back more or less, the valve 9 will close, thus cutting out communication between the brake cylinder and the atmosphere.

If the pedal is permitted to move all the way back to its original position, the release of the brakes will be complete and the distance between the parts 14 will maintain its minimum extent so that valve 9 will remain open.

In order to establish a certain regularity of the partial vacuum acting in the cylinder 3, and with the object of enabling the piston 4 of the brake motor to be actuated when the engine of the vehicle is stopped, there is provided according to this invention an intermediate reservoir 17 (Fig. 2) interposed between the suction pipe 1 and the pipe 2 leading to the cylinder 3. This intermediate reservoir is fitted according to this invention with an automatic valve 19.

What I claim is:

1. In a brake system for motors, the combination, with a suction pipe, and rodding for the brakes, of: a brake cylinder capable of being placed in communication with the suction pipe or with the atmosphere, a piston working therein and on which the engine suction acts to effect the braking operation, closure members for controlling the communication of the cylinder with said pipe and with the atmosphere, a brake-operating element, a lost-motion connection between said operating element and the brake-rodding embodying two movably-related parts, and a movable element for actuating said closure members operatively associated with said lost-motion connection so that its position depends upon the distance between the movably-related parts of said lost-motion connection.

2. In a brake system for motors, the combination, with a suction pipe, and rodding for the brakes, of: a brake cylinder capable of being placed in communication with the suction pipe or with the atmosphere, a piston working therein and on which the engine suction acts to effect the braking operation, closure members for controlling the communication of the cylinder with said pipe and with the atmosphere, a brake-operating element, a lost-motion connection between said operating element and the brake-rodding embodying two movably-related parts, and a movable element for actuating said closure members operatively associated with said lost-motion connection so that its position depends upon the distance between the movably-related parts thereof; said movable element closing the member which controls communication between the brake cylinder and the atmosphere before it opens the member controlling communication between said cylinder and the suction pipe when such distance exceeds a given minimum extent.

3. In a brake system for motors, the combination, with a suction pipe, and rodding for the brakes, of: a brake cylinder capable of being placed in communication with the suction pipe or with the atmosphere, a piston working therein and on which the engine suction acts to effect the braking operation, closure members for controlling the communication of the cylinder with said pipe and with the atmosphere, a brake-operating element, a lost-motion connection between said operating element and the brake-rodding embodying two movably-related parts, a movable element for actuating said closure members, and a flexible connection between the closure-actuating element and the lost-motion connection embodying a wire attached at one end to one of the parts of said lost-motion connection and at the other end to said closure actuating element, and a sheath encasing said wire and attached at one end to the other part of said lost-motion connection and at the other end to a fixed point on the apparatus.

In testimony whereof I affix my signature in presence of two witnesses.

ALBERT DEWANDRE.

Witnesses:
GEORGES VANDER HUEGHEN,
LEONARD LEVA.